March 16, 1971  A. M. ANDREWS  3,570,061
MOLDING APPARATUS
Filed Dec. 4, 1968  4 Sheets-Sheet 1
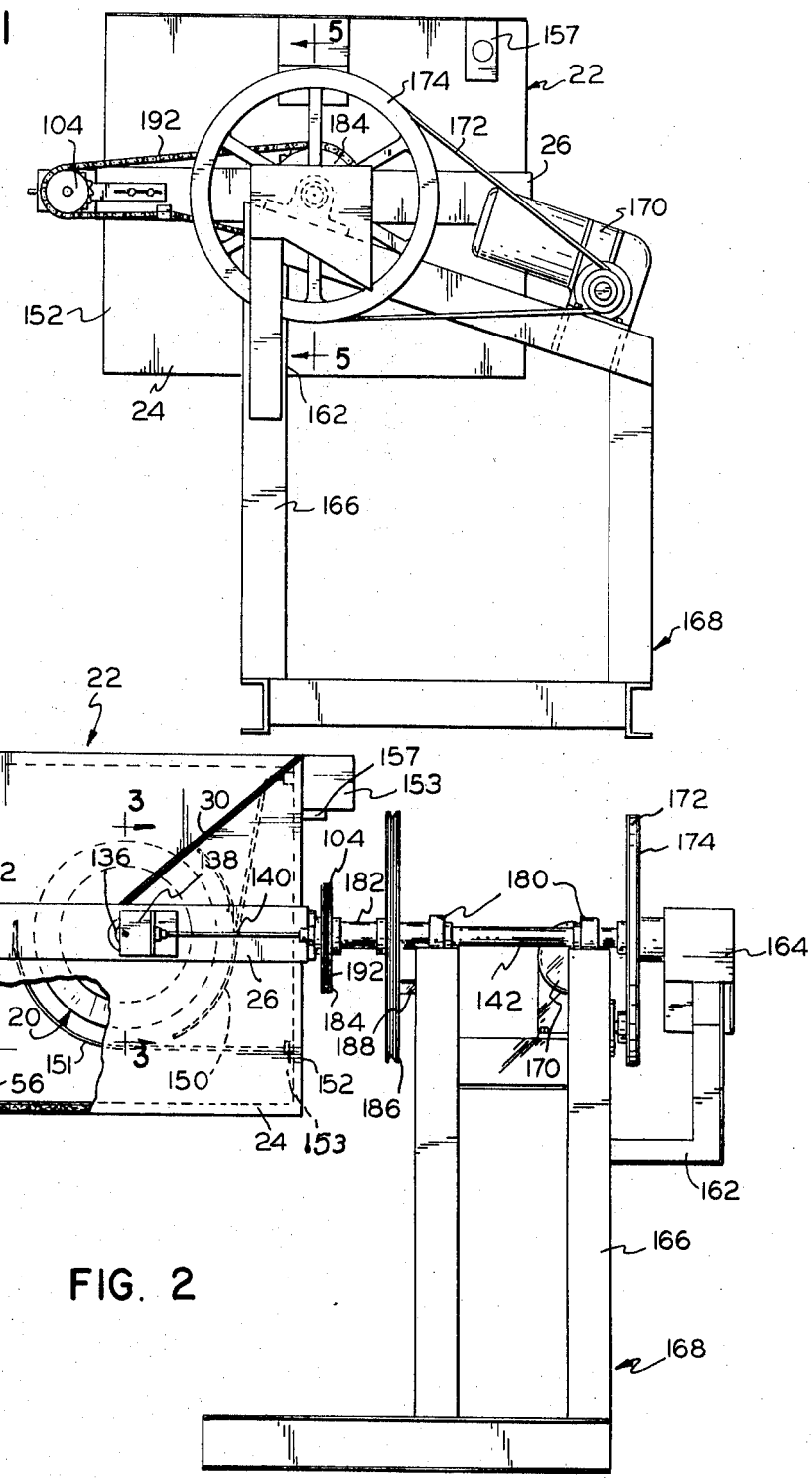
ALVADORE M. ANDREWS
INVENTOR
BY
BUCKHORN, BLORE, KLARQUIST & SPARKMAN
ATTORNEYS March 16, 1971  A. M. ANDREWS  3,570,061
MOLDING APPARATUS
Filed Dec. 4, 1968  4 Sheets-Sheet 2
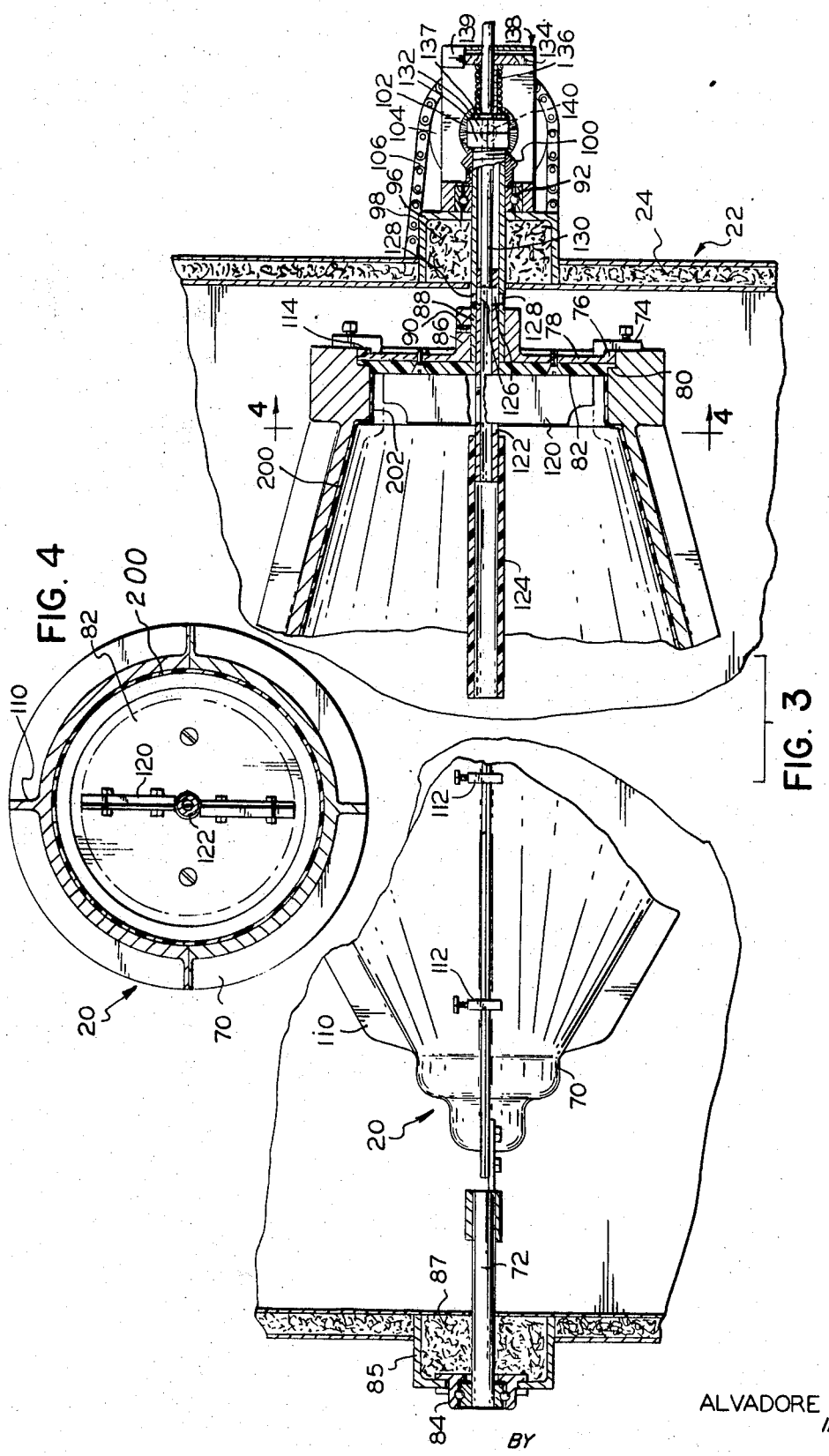
ALVADORE M. ANDREWS
INVENTOR
BY
BUCKHORN, BLORE, KLARQUIST & SPARKMAN
ATTORNEYS March 16, 1971  A. M. ANDREWS  3,570,061
MOLDING APPARATUS
Filed Dec. 4, 1968  4 Sheets-Sheet 3
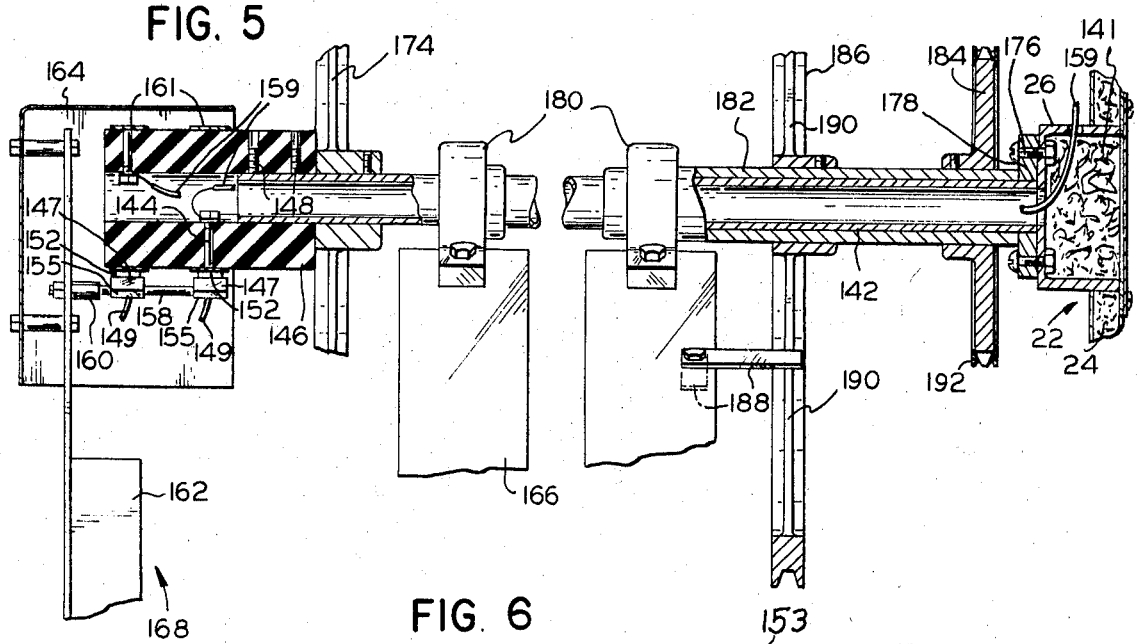
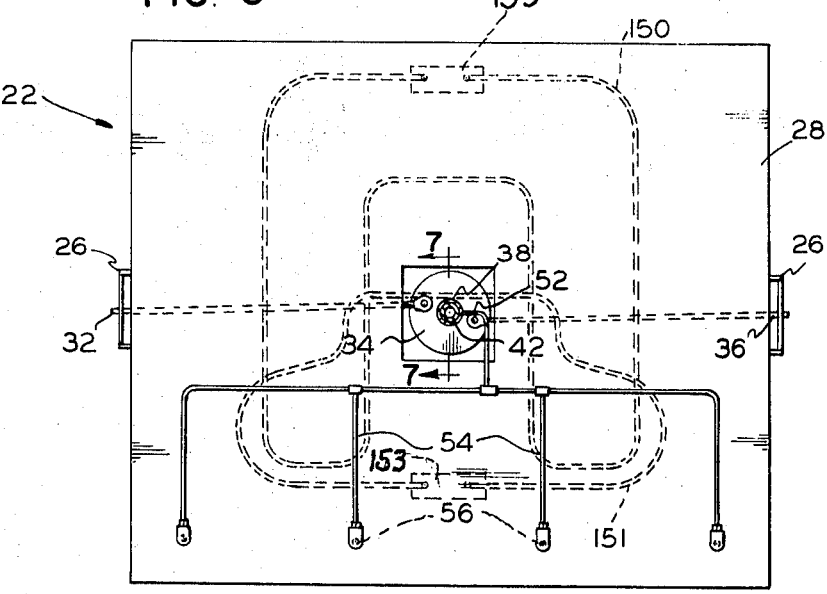
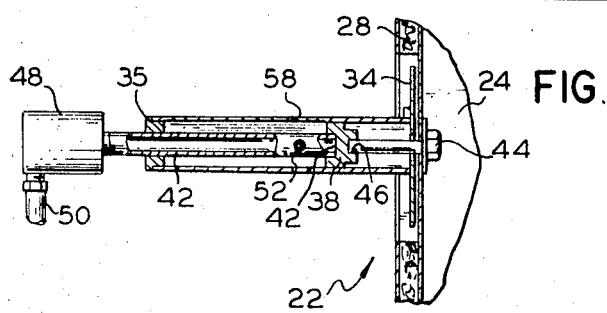
ALVADORE M. ANDREWS
INVENTOR
BY
BUCKHORN, BLORE, KLARQUIST & SPARKMAN
ATTORNEYS United States Patent Office 3,570,061
Patented Mar. 16, 1971

3,570,061
MOLDING APPARATUS
Alvadore M. Andrews, 4621 SW. Beaverton-Hillsdale
Highway, Portland, Oreg. 97221
Filed Dec. 4, 1968, Ser. No. 780,970
Int. Cl. B29c 5/04
U.S. Cl. 18—26
5 Claims

ABSTRACT OF THE DISCLOSURE

Molding apparatus and methods serve to tumble plastic material in shell-like molds after thin skins of plastic material are sprayed on the inner surfaces of the molds and while the molds are rotated in ovens turning the molds on axes at right angles to the axes of rotation of the molds. Paddles in the molds wipe the inner surfaces of end portions of globes being formed from the plastic material to smooth these inner surfaces. Cooling sprays cool the molds and the globes molded therein.

DESCRIPTION

This invention relates to methods of and apparatus for molding and more particularly to tumble molding methods and apparatus.

An object of the invention is to provide new and improved methods of and apparatus for molding.

Another object of the invention is to provide new and improved tumble molding methods and apparatus.

A further object of the invention is to provide methods and apparatus in which a mold containing plastic material is rotated on one axis, revolved on a second axis and is sequentially heated and cooled.

Another object of the invention is to provide methods and apparatus for making plastic globes having no exterior bubbles or other blemishes.

Another object of the invention is to provide tumble molding methods and apparatus for molding globes having finished end portions.

Another object of the invention is to provide simple, inexpensive tumble molding apparatus.

Another object of the invention is to provide a rotating electrical molding oven.

The invention provides tumbling molding methods and apparatus in which plastic material is tumbled in a heated hollow mold while the mold is rotated on one axis and revolved on an axis at right angles to the first-mentioned axis, the mold being cooled after the plastic material is melted and formed on the inner surface of the mold.

In a method and an apparatus forming specific embodiments of the invention, a skin of plastic material is sprayed on the inner surfaces of a mold. Plastic material then is placed in the mold, the mold is closed and is revolved by an oven on a first axis and is rotated on a second axis at right angles to the first axis by a planetary drive driven by a drive rotating the oven. A paddle in the mold scrapes a low adhesion end disc of the mold and also wipes a tubular end portion of a globe being molded to form a smooth, finished, interior surface on the tubular end portion of the globe. Nozzles carried by the oven are supplied with cooling water supplied by a rotary coupling. A vent tube projects into the mold to vent gases from the mold.

In a tumble molding apparatus forming a specific alternate embodiment of the invention, an oven rotated on a first axis carries a mold rotatable on a second axis and has doors which are automatically swung open at the end of the heating step to provide vents for steam generated by spraying cooling water on the heated mold.

In the drawings:

FIG. 1 is a side elevation view of a molding apparatus forming one embodiment of the invention and adapted to perform a molding method forming one embodiment of the invention;

FIG. 2 is a front elevation view of the molding apparatus of FIG. 1;

FIG. 3 is an enlarged, fragmentary, vertical sectional view taken along line 3—3 of FIG. 2;

FIG. 4 is an enlarged, vertical sectional view taken along line 4—4 of FIG. 3;

FIG. 5 is an enlarged, fragmentary, vertical sectional view taken along line 5—5 of FIG. 1;

FIG. 6 is an enlarged vertical sectional view taken along line 6—6 of FIG. 2;

FIG. 7 is an enlarged vertical sectional view taken along line 7—7 of FIG. 6;

Figure 8:
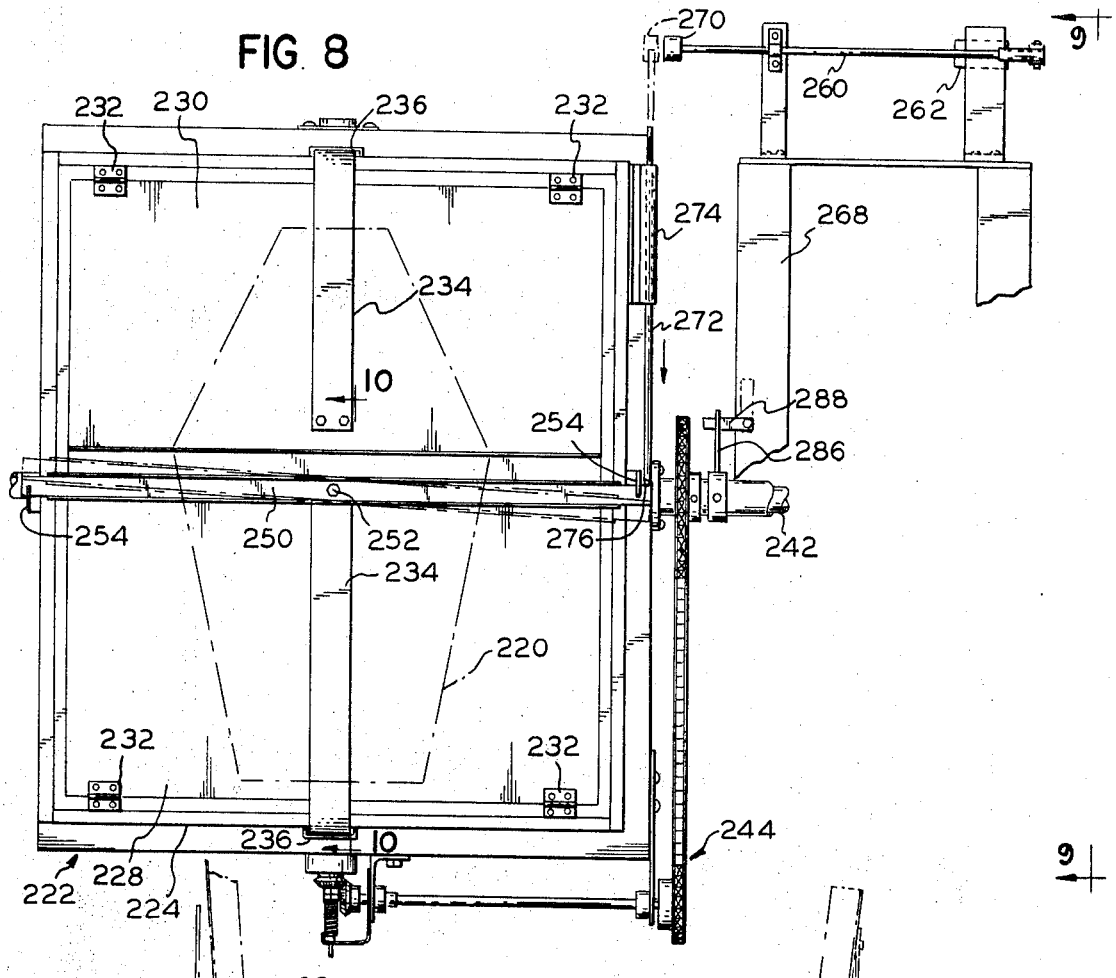
FIG. 8 is an enlarged, fragmentary, top plan view of a molding apparatus forming an alternate embodiment of the invention.

Referring now in detail to the drawings, there is shown in FIGS. 1 to 7 a molding apparatus forming one embodiment of the invention and adapted to perform a molding method forming one embodiment of the invention. The molding apparatus includes a split, shell-like mold 20 (FIG. 3) carried by and rotatable on one axis in an oven or treating chamber 22, which is rotated on a second axis extending at right angles to the axis of rotation of the mold. Powdered or granular plastic material introduced into the mold is tumbled over the inner surfaces of the mold, is melted by the heated mold, and is formed into a globe-like article. The oven inclues a heat insulated chamber 24 carried by a rigid, yoke-like frame 26 and also includes a heat insulated cover 28 separable from the chamber along a parting line 30 and covering the entire top and the entire side of the oven. The cover normally is secured to the chamber by latching bolts 32 (FIG. 6) projecting through holes in keeper end portions of the arms of the frame 26 and carried by a crank disc 34. When a tubular handle 35 (FIGS. 6 and 7), which is journaled on bearings 38 and 40 carried by a pipe 42, is turned, the disc 34 is turned to withdraw the latching bolts 32 from the holes and the cover may be manually lifted by the handle away from the chamber. The pipe 42 mounts the bearing 36 and is threaded into a capping socket 42 in the bearing 38, which is rigidly secured to the cover by a capscrew 44 screwed into a tapped socket 46 in the bearing 38. A rotary pipe joint 48 couples a flexible water supply hose 50 to the pipe 42. A rigid pipe 52 is connected to the pipe 42 and to branch pipes 54 (FIG. 6) leading to nozzles 56 serving to direct streams of water to the mold when water under pressure is supplied to the hose. The handle 36 has a circumferentially extending clearance slot 58 through which the pipe 52 extends and permitting rotation of the handle relative to the pipe.

The mold 20 (FIGS. 3 and 4) includes a fixed, flanged, shell-like mold half 70 bolted to an arbor 72 at one end and secured by a semicircular, flanged, clamp 74 to a rim 76 of a base disc 78 and a dadoed portion 80 of a facing disc 82 at its other end. The arbor 72 is journaled in a bearing 84 carried by a cup 85 secured to the chamber 24 and is shielded by heat insulating material 87. The discs 78 and 82 are secured together by screws, the disc 78 being of metal and having a hub 86 fixed to a tubular shaft 88 by a set screw 90. The facing disc 82 is composed of a low adhesion material such as, for example, polytetrafluoroethylene. The shaft 88 is journaled in a bearing 92 carried by a cupped retainer 94 secured to a cup 96 fixed to the chamber 24 and containing heat insulating material 98. The shaft 88 is driven by a bevel gear 100 keyed thereto which is driven by a bevel gear 102 driven by a sprocket 104 driven by a chain 106. A second, flanged, shell-like, mold half 110 is detachably secured to the mold half 70 by C-clamps 112 and has a semicircular circumferential groove 114 fitting closely over the rim 76 of the base disc 78 and dadoed portion 80 of the facing disc 82. The mold halves 70 and 110 are preferably of die cast metal, and the shape or form, when together, of a carriage lamp globe or fixture.

A blade or paddle 120 (FIGS. 3 and 4) is carried rigidly on a vent pipe 122 carrying a vent hose 124 and having lateral vent ports 126 which are always open to vent ports 128 spaced around the periphery of the shaft 88. The pipe 122 fits closely and rotatably in the shaft 88 and is welded to a rod 130 plugging the outer end thereof. The rod 130 extends loosely through the bevel gear 100 and adjustment nuts 132 adjustably secured to the shaft 88. The rod 130 carries a keying plate 134 keyed by a set screw (not shown) thereto. A compression spring 136 abuts a washer 137 on the nuts 132 and the plate 134. The spring pulls the blade 120 against the disc 82. The plate 134 is rectangular, and is held against rotation relative to the oven 22 by a flange 139 (FIG. 3) of a bracket 138 which journals a shaft 140 to which the bevel gear 102 (FIG. 3) and the sprocket 104 are keyed.

The chamber 24 of the oven 22 carries generally U-shaped, electrical resistance heating elements 150 and 151 (FIG. 6) on a wall 152 (FIG. 2) thereof. The heating elements, when supplied with power, are adapted to heat the mold 20 to a temperature between 300° F. and 480° F. The heating elements are carried by connector blocks 153 fixed to the chamber 24. A thermostat 157 (FIG. 1) mounted on the chamber keeps the temperature in the oven below 480° F. Electrical power is supplied to the heating elements by insulated conductors 159 (FIG. 5) leading from the thermostat and the connector block into the frame 26 which is filled with heat insulating material 141. The conductors extend from the frame 26 through a hollow shaft 142 to connector posts 144 carried by an electrically insulating sleeve 146 keyed by set screws 148 to the shaft 142 and carrying spaced slip rings 161 which are contacted by brushes 147 supplied with power by conductors 149 leading to a switch (not shown) connected to a power line (not shown). The brushes are carried by insulating holders 155 secured in adjusted positions by set screws (not shown) on a mounting rod 158 screwed into a socket 160 carried by a bracket 162. A cover 164 carried by the bracket 162 enshrouds the slips rings and brushes. The bracket 162 is rigidly secured to a post 166 of a base frame 168.

As best shown in FIGS. 2 and 6, the heating elements partially encircle the mold 20 while leaving an opening between the uppermost portions of the heating elements for access to the mold and for ease of removal of the upper mold half 110 and a globe 200 molded by the mold 20. The heating elements have electrically insulating sheaths or encasements, and, while being capable of being shaped as desired, are sufficiently strong to be self-sustaining when supported by only their ends which are supported by the connector blocks. The heating elements extend somewhat over 180° around the mold, and extend substantially from end to end of the mold. The elements are so shaped that greater lengths thereof are adjacent the larger diameter central portion of the mold than the lengths of the elements adjacent the smaller diameter end portions of the mold to provide substantially uniform heat per surface area of the mold. The heating elements are positioned close to the mold but are spaced sufficiently far from the mold to provide clearance. While the heating elements are shown mounted in fixed positions in the chamber 24, the heating elements may be carried by the cover 28 and detachably plug into the upper one of the connector blocks 153. The close proximity of the elements 150, 151 to the mold permits rapid heating thereof minimizing the cycle time.

To rotate the oven 22, an electric motor drive 170 (FIGS. 1 and 2) mounted on the base frame 168 is started by the operator, and drives the shaft 142 by a belt 172 and a pulley 174 keyed to the shaft 142. The hub 140 (FIG. 5) is secured by bolts 176 to a flange 178 fixed rigidly to the shaft 142 so that rotation of the shaft rotates the oven 22. The shaft 142 is journaled in bearings 180 mounted on the frame 166. A sleeve 182 is freely rotatable on the shaft 142 and is confined against longitudinal movement between the flange 178 and the right-hand bearing 180, as viewed in FIG. 5. A sprocket 184 and a spoked stop wheel 186 are keyed to the sleeve 182. When the operator swings a locking bar 188 from its release position shown in full lines in FIG. 5 to its stop position shown in broken lines in FIG. 5, one of spokes 190 of the wheel 186 engages the bar 188 to prevent rotation of the stop wheel 186 and the sleeve 182. This holds the sprocket 184 against rotation and causes the sprocket 184 to act as a sun gear to drive the sprocket 104 (FIGS. 1, 2 and 7) through a chain 192, the sprocket 104 acting as a planetary gear as it is revolved by the oven 22 around the sprocket 184. Rotation of the sprocket 104 rotates the mold 20 through the bevel gears 102 and 100 (FIG. 4) and the shaft 88, which rotates the discs 78 and 82 to which the mold half 70 is rigidly clamped.

OPERATION OF THE EMBODIMENT OF FIGS. 1 TO 7

With the cover 28 (FIGS. 1 and 2) and the mold half 110 removed and the mold half 70 open and facing upwardly, the operator first sprays the interior faces of the mold halves with a butyrate base paint to form a tough, smooth, continuous, thin skin of butyrate on the smooth inner surfaces of the mold halves. The butyrate base paint rapidly dries, and may be, for example, R–99 clear paint sold by the Bee Chemical Co. of Chicago, Ill. After the paint is dry, a matter of a few seconds after its application, a measured quantity of plastic material, powdered or granular butyrate is placed in the upwardly facing mold half 70. The material may be Tenite ® Butyrate sold by Eastman Plastics.

The operator then places the mold 110 on the mold half 70 and the discs 78 and 82, secures the mold halves together with the clamps 112, places the cover 28 on the chamber 24 to close it and locks the cover in place. With the bar 188 (FIGS. 2 and 5) in its locking position holding the wheel 186 against rotation with the oven, the operator closes the switches to the motor drive and the heating elements 150 and 151 (FIG. 6). The motor drive turns the shaft 142 (FIG. 2) to slowly rotate the oven 22 and the chain 192, sprockets 104 and 184, gears 100 and 102 (FIG. 4) and shaft 88 rotate the mold 20 at twice the rate of rotation of the oven.

The heating elements 150 and 151 (FIG. 6) heat the mold 20 and the interior of the oven 22 to about 420° F. under the control of the thermostat 157 (FIG. 1). This heats and makes the skin of butyrate on the inner surfaces of the mold halves tacky and a layer of the powdered molding material being tumbled sticks to the entire face of the skin, is heated and becomes tacky itself, which causes additional molding material to stick to the layer and in turn soften and become tacky. This continues until all the molding material has been formed or cast against the interior of the mold to form a layer of uniform thickness and defining a globe 200. The rotations and the heating are continued to work out air bubbles and densify the molded material. As the material is melted to emit gas and air, the gas and air are vented to the atmosphere through the vent tube 124.

The blade 120 (FIG. 4) does not rotate with the mold because of the keying plate 134, and scrapes the face of the low friction disc 82 to keep any molding material from sticking to the disc 82. The ends of the blade are shaped and mold the inner, lower portion 202 of the globe 200 as the molding material is formed on the mold halves and against the disc 82. The molding material, as it is first formed, is porous and spongy and of a thickness greater than the space between each end of the blade 120 and the mold (about 5/16 inch in one embodiment), so that the ends of the blade wipe and shape the adjacent portions of the molding material into smooth surfaces. This action may be termed a spinning or turning action. Then, the heating and turning action is continued after all the material has been deposited on the inner surfaces of the mold, and the material densifies to about .060 inch in thickness to move the inner surfaces of the material outwardly toward the inner surfaces of the mold. This may be termed a shrinking operation, and the portion 202 "shrinks" radially outwardly away from the ends of the blade 120.

After the globe has been cast and densified, the heating elements are turned off and cooling water under pressure to the hose 50 (FIG. 2) is turned on. The water is sprayed by the nozzles 56 in a fine mist on the mold which flash the water into steam which escapes between the cover 28 and the chamber. This cools the mold and the globe. Then the operator stops the water, turns off the motor drive 170, unlatches and takes off the cover 28, and releases the bar 188 and turns the wheel 186, if necessary, to position the mold half 70 lowermost. Then the mold half 110 is removed and the finished globe 200 is removed from the mold half 70. The operation may then be repeated to mold another globe.

EMBODIMENT OF FIGS. 8 TO 10

Figure 9:
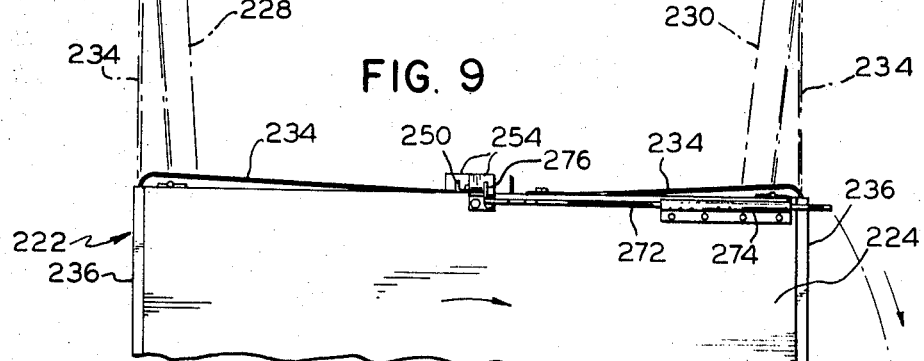
FIG. 9 is an enlarged, fragmentary, elevation view taken along line 9—9 of FIG. 8.
Figure 10:
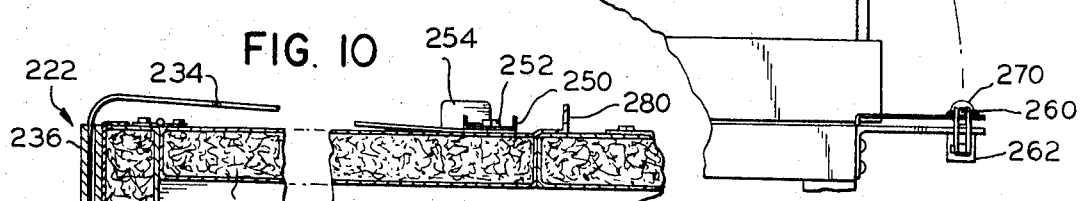
FIG. 10 is an enlarged, fragmentary, vertical sectional view taken along line 10—10 of FIG. 8.

The apparatus shown in FIGS. 8 to 10 and forming an alternate embodiment of the invention is generally similar to the apparatus of FIGS. 1 to 7, and includes an oven 222 rotatable by a shaft 242 corresponding to the shaft 142 and driven by an electric motor drive (not shown) like the drive 170. A mold 220 is rotated on an axis at right angles to the shaft 242 by a planetary gearing drive 244 like that rotating the mold 20 but including an indexing arm 286 stopped by a stop bar 288. The oven 222 includes a chamber 224 and doors or covers 228 and 230 secured by hinges 232 to the opposite sidewalls of the chamber. The covers 228 normally are biased to their open positions shown in broken lines in FIG. 10 by straight leaf springs 234 whose lower ends are freely slidable along guiding retainers 236.

The covers 228 and 230 can be moved to their closed positions shown in FIGS. 8 and 10 and a latching bar 250 mounted by a bolt 252 on the cover 228 can be swung under hook 254 on the chamber to hold the covers closed. During the heating portion of the molding cycle, the covers are so latched. When the heating is stopped and the cooling sprays are started, an actuator rod 260 (FIG. 1) is moved by a solenoid 262 on the base frame 238 to its broken line position of FIG. 1. This positions a camming head 270 in the path of a release bar 272 slidable in guide 274 on the oven and pushes the bar 272 to the left, as viewed in FIG. 9. This causes a dog 276 on the rod 272 to push the latching bar 250 out from under the hooks 254, and the springs 234 swing the covers open to permit the steam generated from cooling to escape freely. The cover 228 has a retaining lip 280 (FIG. 10), which overlaps the cover 230. The operation of the just described apparatus is like that of the apparatus of FIGS. 1 to 7 except that the covers 228 and 230 are opened at the start of the cooling step.

The above-described methods and apparatus serve to quickly and inexpensively mold the globes 200 without flaws and without air bubbles. The globes have their lower end portions 202 finished perfectly and require no trimming or finishing. The apparatus is simple, inexpensive and effective.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a molding apparatus,
an openable hollow mold,
drive means for turning said mold on axes extending at an angle to each other to tumble granular plastic material in said mold,
heating means comprising an oven enclosing and carrying said mold and turned by said drive means on one of said axes,
said mold being turned by said drive means on the other of said axes,
said oven having a vent opening, a door closing said vent opening and means for opening said door while said oven is being turned, and
cooling means for cooling said mold and the hollow article in said mold.

2. In a molding apparatus,
an openable hollow mold,
drive means for turning said mold on axes extending at an angle to each other to tumble granular plastic material in said mold,
heating means for heating said mold to melt the plastic material and deposit it along the inner surface of said mold to form a hollow article,
cooling means for cooling said mold and the hollow article in said mold, and
means for scraping a portion of the inner surface of said mold to keep the plastic material from building up thereon.

3. In a molding apparatus,
an openable hollow mold,
drive means for turning said mold on axes extending at an angle to each other to tumble granular plastic material in said mold,
heating means for heating said mold to melt the plastic material and deposit it along the inner surface of said mold to form a hollow article,
cooling means for cooling said mold and the hollow article in said mold, and
wiping means for wiping a portion of the interior surface of the article as the article is formed in said mold.

4. Molding apparatus as set forth in claim 3 wherein said wiping apparatus comprises a paddle moved relative to said mold while the article is being formed.

5. In a molding apparatus,
an openable hollow mold,
drive means for turning said mold on axes extending at an angle to each other to tumble granular plastic material in said mold,
heating means for heating said mold to melt the plastic material and deposit it along the inner surface of said mold to form a hollow article,
cooling means for cooling said mold and the hollow article in said mold,
said mold including a pair of separable mold halves having a tubular end portion,
an end disc secured to one of said end halves in a position closing said tubular end portion, and
a paddle in said mold adapted to scrape said end disc to keep said end disc free of plastic material and also adapted to wipe the inner surface of molding material being formed on the interior of said tubular end portion to finish said inner surface.

References Cited

UNITED STATES PATENTS 2,581,248  1/1952  Ganz _____ 18—41X
2,816,347  11/1957  Ganz _____ 18—41X (Other references on following page)

UNITED STATES PATENTS

| | | | |
|---|---|---|---|
| 2,957,202 | 10/1960 | Rekettye | 18—26 |
| 3,301,925 | 1/1967 | Engle | 18—26 |
| 3,366,993 | 2/1968 | Lemelson | 18—26 |
| 3,372,820 | 3/1968 | Barnett | 18—26X |
| 3,388,429 | 6/1968 | Barnett et al | 18—26 |
| 3,412,431 | 11/1968 | Lemelson | 18—26 |
| 3,416,193 | 12/1968 | Freeborn | 18—26 |
| 3,454,988 | 7/1969 | Cremer | 18—26 |

ANDREW R. JUHASZ, Primary Examiner

U.S. Cl. X.R.

264—309